US007976937B2

(12) United States Patent
Shi et al.

(10) Patent No.: US 7,976,937 B2
(45) Date of Patent: Jul. 12, 2011

(54) COATING FOR A STEAM-GENERATING DEVICE

(75) Inventors: Jianli Shi, Singapore (SG); Petra Elisabeth De Jongh, Eindhoven (SG); Marcel Rene Boehmer, Eindhoven (NL); Gerard Cnossen, Drachten (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 275 days.

(21) Appl. No.: 10/553,919

(22) PCT Filed: Apr. 23, 2004

(86) PCT No.: PCT/IB2004/050502

§ 371 (c)(1), (2), (4) Date: Oct. 20, 2005

(87) PCT Pub. No.: WO2004/096539

PCT Pub. Date: Nov. 11, 2004

(65) Prior Publication Data

US 2006/0210784 A1 Sep. 21, 2006

(30) Foreign Application Priority Data

Apr. 25, 2003 (SG) ....................... PCT/SG03/00105

(51) Int. Cl.
*B32B 3/26* (2006.01)
*B32B 5/16* (2006.01)
*B32B 18/00* (2006.01)
*D06F 9/00* (2006.01)

(52) U.S. Cl. ..................... 428/304.4; 428/323; 428/325; 38/77.8; 38/77.83

(58) Field of Classification Search .................. 428/323, 428/325, 435, 351, 704, 425.6, 297.1, 300.7, 428/458, 459, 472.3, 474.4, 304.4; 427/245, 427/427, 427.3, 427.5; 38/77.83, 77.8; 148/420; 210/697; 252/175, 179, 181

See application file for complete search history.

(56) References Cited

U.S. PATENT DOCUMENTS

| | | | | |
|---|---|---|---|---|
| 3,499,237 | A | 3/1970 | Piper | |
| 3,551,183 | A * | 12/1970 | Vondracek et al. | 427/318 |
| 3,846,182 | A | 11/1974 | Huff et al. | |
| 4,462,842 | A | 7/1984 | Uchiyama et al. | |
| 4,576,864 | A * | 3/1986 | Krautter et al. | 428/328 |
| 4,822,686 | A * | 4/1989 | Louison et al. | 428/457 |
| 5,390,432 | A * | 2/1995 | Boulud et al. | 38/77.83 |
| 6,684,539 | B2 * | 2/2004 | Boulud et al. | 38/77.83 |

FOREIGN PATENT DOCUMENTS

| | | | |
|---|---|---|---|
| DE | 19606519 | A1 | 8/1997 |
| DE | 19855151 | A1 | 5/2000 |
| EP | 0425043 | A1 | 5/1991 |
| GB | 773741 | | 5/1957 |
| GB | 984324 | | 2/1965 |
| GB | 2077624 | A | 12/1981 |
| WO | WO /0168971 | * | 9/2001 |
| WO | 2004037931 | A1 | 5/2004 |

* cited by examiner

*Primary Examiner* — Timothy M Speer
*Assistant Examiner* — Jonathan C Langman

(57) ABSTRACT

A dual-layer coating for application in a steam-generating device is disclosed. A impermeable first layer thermally insulates the heated surface, while a second, porous layer enlarges the contact area, leading to an efficient conversion of liquid into vapor.

15 Claims, 2 Drawing Sheets

COATING FOR A STEAM-GENERATING DEVICE

Figure 1:
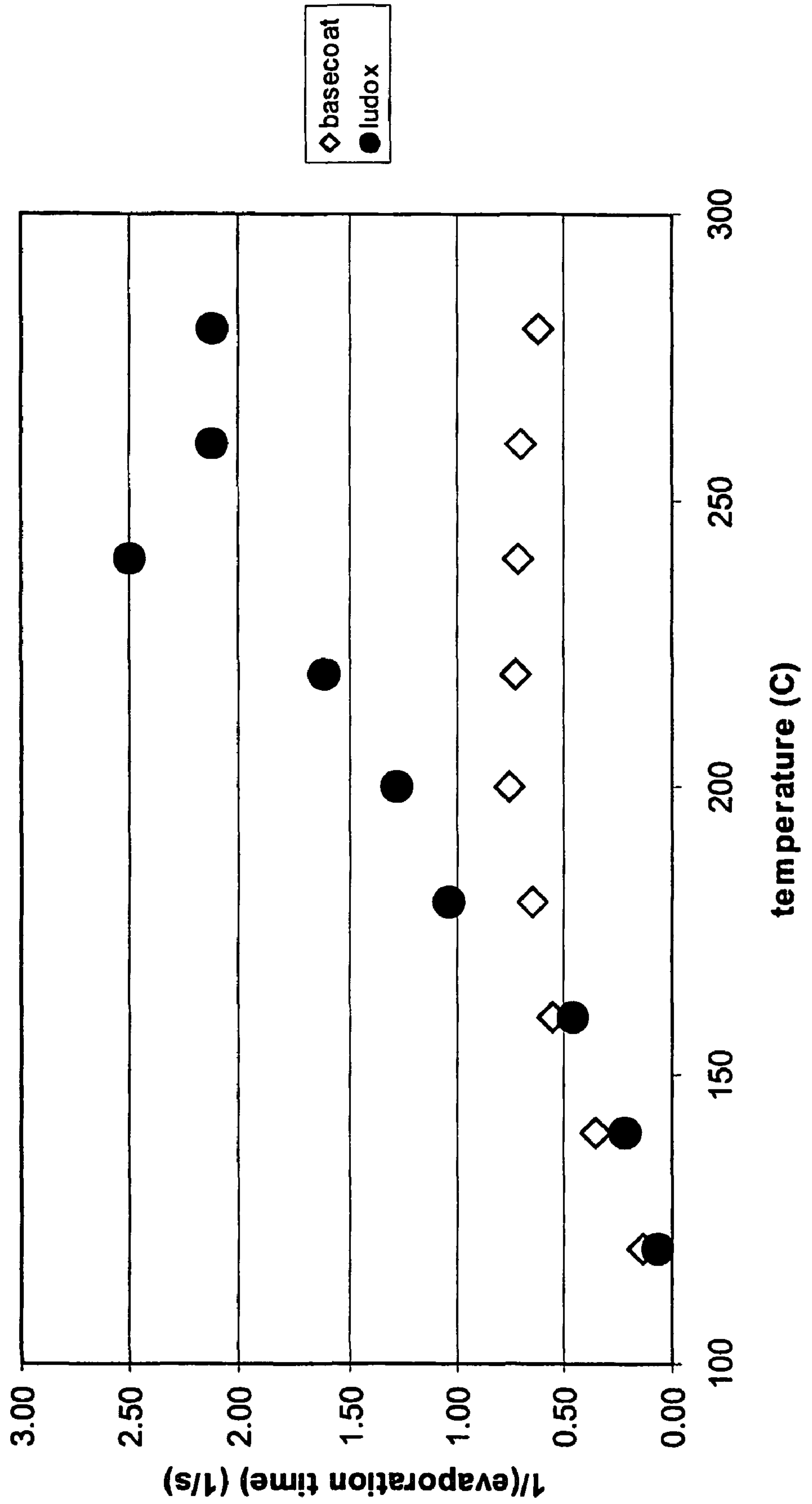

Laundry irons launched in 1992 had a steam rate and a power which were about half those of irons brought on the market in 2002. The higher steam rate, up to 40 grams per minute, makes the ironing process faster. This trend towards higher steam rates imposes increased demands on the control of the heat transfer between the steam chamber surface and the liquid to be evaporated. The efficiency of steam formation depends on the temperature of the surface of the steam chamber. If the temperature of the steam chamber is too high, higher than about 160° C., a vapor layer develops in-between the substrate and the water to be evaporated. This reduces the heat transfer dramatically. At a fixed, high dosing rate, liquid water may build up in the steam chamber, thus causing leakage, and the expulsion of macroscopic droplets rather than steam may occur in the so-called shot-of-steam area.

As most irons have only one heating element, which is used for heating the sole-plate as well as the steam chamber surface, a too high temperature in the steam chamber easily occurs. The lowering of the heat transfer efficiency due to a too high surface temperature is the Leidenfrost effect, which is well known to those skilled in the art. Coatings have been applied on the surface of the steam iron in order to reduce the Leidenfrost effect. Those coatings can contribute positively to the efficiency of the heat transfer as they reduce the surface temperature.

Another effect that determines the evaporation rate of water is the wettability of the steam chamber surface. If dosed droplets spread easily on the surface, a larger surface area is used for the evaporation, and, therefore, the evaporation time is shorter. This effect is enhanced if the layer applied on the surface is porous. In that case the liquid can penetrate into the layer by capillary forces and a large surface area is used to evaporate the liquid. The capillary effects will only take place rapidly if the porosity is high and the wetting is good. Therefore a hydrophilic porous coating can contribute positively to the efficiency of the heat transfer as it will increase the surface area used.

Yet another factor influencing the evaporation rate is the presence of additives. These additives, for instance fragrances, can be added to the water tank of an iron and will be vaporized in the steam chamber. These additives are frequently surface active, have different boiling points than water, and the formulations in which they are available may include co-solvents. Coatings that enhance the evaporation rate will reduce problems with the steam formation in the presence of these additives.

To achieve efficient steaming, both organic and inorganic coating materials have been applied in steam chambers. The first requirement is that coatings used in steam-generating devices should have a high temperature resistance. Therefore, heat-resistant organic polymers, such as polyimides, are often used as a binder in steam chamber coatings. Polyimide-based coatings are efficient as thermally insulating coatings, but polyimide is fairly hydrophobic. Consequently, the contact area of a single drop with the steam chamber surface is relatively small, which leads to a fairly slow conversion of water into steam.

Completely inorganic coatings have a better temperature stability. They have also been used as steam chamber coatings, see, for example, those described in U.S. Pat. No. 5,060,406 and GB 773,741. These coatings have a degree of porosity which, together with their hydrophilic properties, leads to an increase in the surface area, and thus to very high steam rates if used at the proper temperature. However, the porosity of the coatings should be limited, as the liquid to be evaporated should not be able to reach the metal surface, which can easily be at a too high temperature for efficient steam formation.

The present invention aims to provide a coating a steam-generating device, such as a steam chamber in an iron, that does not show the above problems. To that end, the present invention provides a coating for a steam-generating device according to the preamble that is characterized in that it comprises a first layer and a second layer, wherein the first layer is essentially impermeable to water and the second layer is hydrophilic.

According to the invention, first a relatively dense, thermally insulating and essentially water-impermeable layer is deposited on a heat-conducting substrate and on top of this layer a hydrophilic porous layer is applied. The dense layer will lower the substrate temperature to a value below the Leidenfrost point while the second layer will be porous and hydrophilic, thus ensuring an efficient spreading of the liquid. Each of the two layers may comprise sublayers, and in addition an adhesion promoter may be applied in-between the first and the second layer.

The composition used for the second layer may be different from that of the first layer or it may be the same. If the same composition is used, a variation in porosity of the layer can be obtained through a change in the application technique. If, for example, spray-coating is used, a relatively dense layer will be formed if the distance between the spray gun and the substrate to be coated is small. The freshly deposited layer will be wet and a dense film can be formed after drying. A more porous layer is formed if the distance between the spray gun and the substrate is increased, allowing more evaporation of solvent from the sprayed droplets before they reach the surface.

Variations in the porosity, leading to an impermeable first layer and a porous second layer, may also be established by choosing compositions of the same starting materials but with different binder to filler ratios. Depending on the filler shape and size distribution, a maximum particle volume fraction in the deposited layer can be found, which is usually around 40-55% for commercially available polydisperse powders. If the amount of binder is insufficient to fill up the rest of the volume, porous layers will be obtained. If enough binder is present, dense layers can be deposited, provided that suitable deposition techniques are chosen. A similar composition but with a higher particle/binder ratio can be used to obtain the porous top-layer. The particle size co-determines the pore size for the porous layer, while for the dense layer the particle size should not exceed the thickness of the layer.

The materials chosen for the dense thermally insulating layer and the porous layer may also be different. This provides a freedom of choice from hydrophobic materials, preferably materials with good thermally insulating properties such as polyimide as a first layer and a thin layer of a hydrophilic material on top.

Many materials are suitable for the thermally insulating layer, provided that they have a sufficient thermal stability and that a sufficient thickness can be reached. Polyimide-based binders filled with inorganic particles may be used, as may as enamels or phosphate glasses. Particle-filled sol-gel materials may also be advantageously used to deposit a first layer on the surface of the steam chamber; especially hybrid sol-gel precursors which contain fewer than four hydrolyzable groups may be used. Of the hybrid sol-gel precursors, layers made from methyltri(m)ethoxysilane and phenyltri(m)ethoxysilane have the best temperature stability. The thickness of the thermally insulating layer is typically around 30

μm, but thicker layers of up to 80 μm and above have been applied. A preferred method for the application of the layer is spray-coating. Depending on the curing profile and application technique, relatively dense layers of polyamide imide and methyltrimethoxy silane will take up around 0.5-3% of water, which is considered as essentially impermeable.

On top of this first, dense layer, a hydrophilic porous layer can be applied. These porous layers may be made from materials that are hydrophilic. Examples of materials which are specifically suitable for the second layer are mono-aluminum phosphate binders filled with inorganic particles, for example clay particles, $SiO_2$ particles, or $Al_2O_3$ particles. Alternatively, a sol-gel precursor may be chosen as a binder. Even systems without binder, such as certain types of colloidal silica, have been successfully used. A typical thickness of the porous layer is about 15 μm. As long as the adhesion to the first layer is strong, some degree of cracking will not adversely affect the functionality of the steam chamber coating. A preferred method for the application of the layer is spray-coating.

Although separate curing of the two layers is possible, it is advantageous to cure the two layers together. This saves a curing cycle and, more importantly, can improve the adhesion between the two layers.

Figure 2:
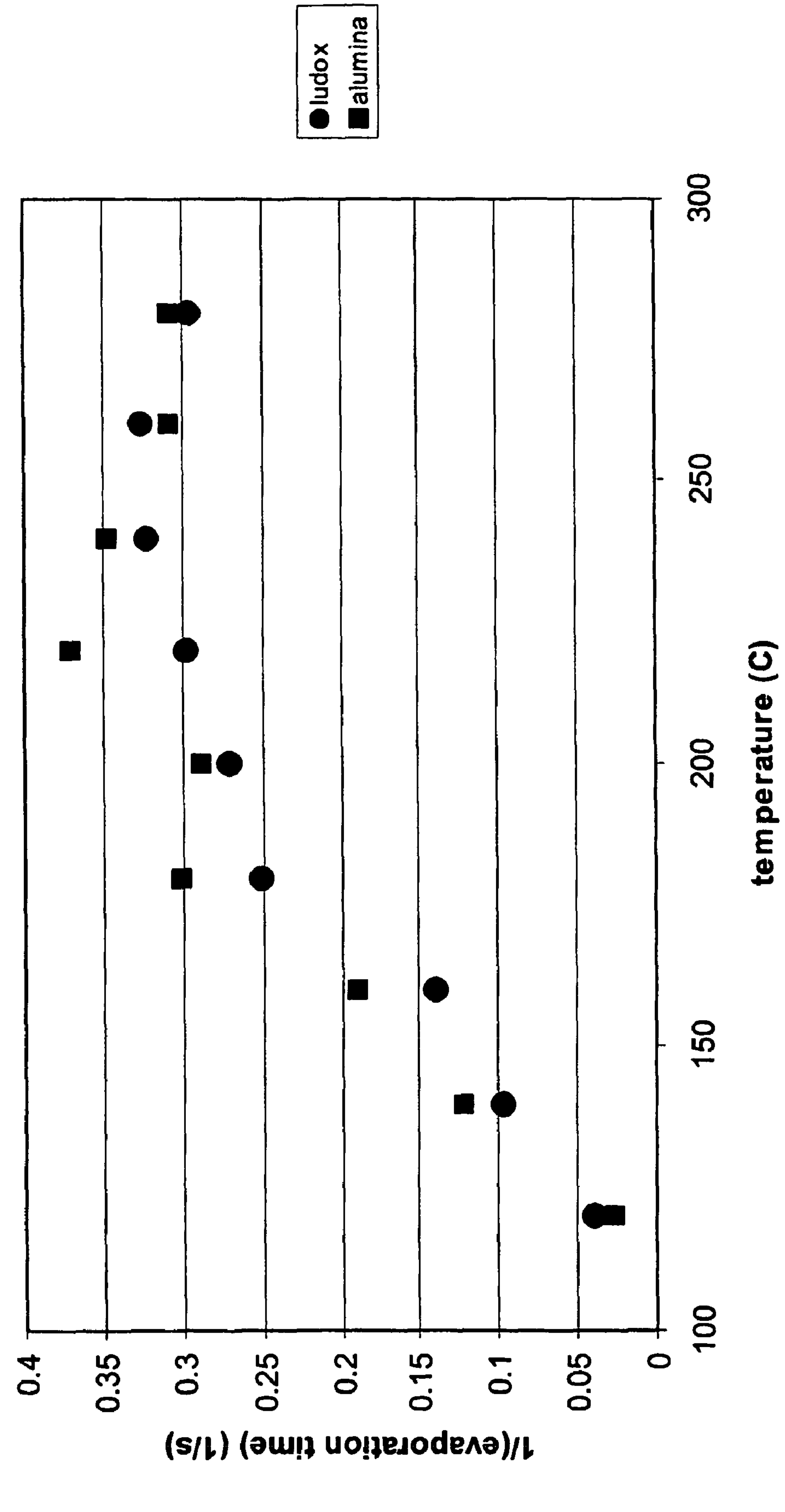

The invention is further illustrated in the following examples and the accompanying drawing, in which:

FIG. 1 shows the reciprocal evaporation time of 0.5-g droplets of water on a polyamide/imide coating, with and without a top-coat of silica (Ludox) as disclosed in example 1; and FIG. 2 shows the reciprocal evaporation time of 0.5-g droplets of water on a MTMS base-coat and a silica (Ludox) or alumina top-coat as a function of temperature as described in examples 2 and 3.

EXAMPLE 1

A dual-layer coating was prepared using a polyamide/imide resin containing mica and aluminum flakes. The total volume fraction of fillers in the layer was 48%. The layers were applied by spray-coating on an aluminum substrate. The coating was cured at 280° C. for 10 minutes, after which a second layer was spray-coated consisting of a commercially available silica sol, Ludox AM, which was diluted to 3% with deionized water. No subsequent heat treatment was performed. The thickness of the polyamide/irnide layer was about 40 μm and the thickness of the Ludox layer was about 10 μm. The reciprocal evaporation time of a 0.5-g water droplet as a function of the substrate temperature is given in FIG. 1. For comparison the reciprocal evaporation time of a droplet on a single layer coating of the polyamide/imide coating is given in the same Figure. The evaporation rate of the dual-layer system is significantly higher over the entire temperature range.

EXAMPLE 2

100 g of methyltrimethoxy silane (MTMS) in 50 g of ethanol was hydrolyzed by addition of 1.4 g of maleic acid and 77 g of deionized water. After hydrolysis, 23 g of Al flakes and 47 g of mica flakes were added. This lacquer was spray-coated onto an aluminum substrate to form a dense first coating layer. The layer was dried at about 100° C., after which an aqueous silica sol was dosed onto the coating. After drying of the silica layer, the layers were co-cured at 300° C. The resulting thickness of the first MTMS coating was 100 μm and the thickness of the silica layer was 25 μm. FIG. 2 shows the evaporation rate of 0.5 g water droplets. Without the application of the second layer the evaporation rate is too low to be measured.

EXAMPLE 3

100 g of methyltrimethoxy silane (MTMS) in 50 g of ethanol was hydrolyzed by addition of 1.4 g of maleic acid and 77 g of deionized water. After hydrolysis, 23 g of Al flakes and 47 g of mica flakes were added. This lacquer was spray-coated onto an aluminum substrate. The layer was dried at about 100° C., after which a 1-M alumina-sol, prepared from hydrolyzed aluminum sec-butoxide and filled with alumina particles, was spray-coated on top of this layer. The layers were cured at 300° C. The thickness of the first, dense layer was 54 μm and the thickness of the top-coat layer was 14 μm. The evaporation rate of 0.5-g water droplets was the same as that observed in example 2, see FIG. 2. Without the application of the second layer the evaporation rate is too low too be measured.

The invention claimed is:

1. A coating for an interior surface of a steam-generating device, the coating comprising:

a first layer deposited on the interior surface of the steam-generating device; and a second layer deposited over the first layer, wherein the first layer is essentially impermeable to water and is thermally insulating and the second layer is hydrophilic and comprises inorganic particles selected from one of clay particles and $Al_2O_3$ particles and mono-aluminum phosphate binders.

2. The coating according to claim 1, wherein the second layer is a porous layer.

3. The coating according to claim 1, wherein the first layer comprises at least one of a polyimide, polyamide-imide, and enamel.

4. The coating according to claim 3, wherein the first layer comprises inorganic particles.

5. The coating according to claim 1, wherein a thickness of the first layer is around 30 to 100 μm and wherein the second layer is between 10 and about 15 μm in thickness.

6. The coating according to claim 5, wherein the steam-generating device is part of an electrical domestic appliance selected from one of a steam iron, a system iron, a steamer, a garment cleaner, a heated ironing board, or a facial steamer.

7. The coating according to claim 1, wherein the first layer is adhered to the second layer.

8. The coating according to claim 1, wherein the first layer has a composition that is thermally stable.

9. The coating according to claim 1, wherein the mono-aluminum phosphate binders are filled with the inorganic particles.

10. The coating according to claim 1, wherein compositions of the first and the second layers are cured during a same curing cycle to improve adhesion between the first and second layers.

11. A coating for an interior surface of a substrate of a steam-generating device, the coating comprising:

a first layer deposited on the interior surface of the substrate of the steam-generating device; and a second layer deposited over the first layer, wherein the first layer is essentially impermeable to water and is thermally insulating and the second layer is hydrophilic and comprises inorganic particles selected from one of clay particles and $Al_2O_3$ particles and mono-aluminum phosphate binders.

12. A coating for an interior surface of a substrate of a steam-generating device, the coating comprising:

a first layer deposited on the interior surface of the substrate of the steam-generating device for lowering a temperature of the substrate to a value below the Leidenfrost point; and a second layer deposited over the first layer, the first layer is essentially impermeable to water and is thermally insulating and the second layer is hydrophilic and comprises inorganic particles selected from one of clay particles and $Al_2O_3$ particles and mono-aluminum phosphate binders.

13. The coating according to claim 12, wherein the first layer is applied by spraying the first layer onto the interior surface of the substrate of the steam-generating device from a range selected to form initially a dense wet first layer.

14. The coating according to claim 12, wherein the second layer is applied by spraying the second layer onto the first layer from a range selected to enable evaporation of solvent from sprayed droplets of the second layer before reaching a surface of the first layer.

15. A coating for an interior surface of a substrate of a steam-generating device, the coating comprising:

a first layer deposited on the interior surface of the substrate for lowering a temperature of the substrate to a value below the Leidenfrost point; and a second layer deposited over the first layer, the first layer is essentially impermeable to water and is thermally insulating and the second layer is hydrophilic wherein a composition of starter materials of the first layer and the second layer are similar and the second layer comprises inorganic particles selected from one of clay particles and $Al_2O_3$ particles and mono-aluminum phosphate binders filled with the inorganic particles.

* * * * *